June 30, 1964    F. PAPKE    3,139,478
VIEWFINDER FOR PHOTOGRAPHIC CAMERAS PROVIDING, IN THE FIELD
OF VIEW THEREOF, IMAGES OF BOTH A PICTURE LIMITING FRAME
AND A REMOTELY LOCATED INDICATING MEANS
Filed Jan. 4, 1961    3 Sheets-Sheet 1

INVENTOR
FRIEDRICH PAPKE

BY *Blum, Moscovitz,*
*Friedman & Blum*

ATTORNEYS

INVENTOR
FRIEDRICH PAPKE

ATTORNEYS

June 30, 1964    F. PAPKE    3,139,478
VIEWFINDER FOR PHOTOGRAPHIC CAMERAS PROVIDING, IN THE FIELD
OF VIEW THEREOF, IMAGES OF BOTH A PICTURE LIMITING FRAME
AND A REMOTELY LOCATED INDICATING MEANS
Filed Jan. 4, 1961    3 Sheets-Sheet 3

INVENTOR
FRIEDRICH PAPKE
BY Blum, Moscovitz,
Friedman & Blum

ATTORNEYS 3,139,478
VIEWFINDER FOR PHOTOGRAPHIC CAMERAS PROVIDING, IN THE FIELD OF VIEW THEREOF, IMAGES OF BOTH A PICTURE LIMITING FRAME AND A REMOTELY LOCATED INDICATING MEANS
Friedrich Papke, Braunschweig-Gliesmarode, Germany, assignor to Voigtlander A.G., Braunschweig, Germany, a corporation of Germany
Filed Jan. 4, 1961, Ser. No. 80,581
Claims priority, application Germany Jan. 18, 1960
10 Claims. (Cl. 88—1.5)

This invention relates to viewfinders for photographic cameras and, more particularly, to a novel viewfinder which forms, within the viewfinder and in the field of view of an observer looking through the viewfinder at the objective to be photographed, not only an image of a picture limiting frame but also, and in addition, an image of exposure condition indicating means of the camera physically displaced substantially from the image limiting means.

It is well-known in the camera art to provide the observer looking at an objective with, in addition to an image of a picture limiting frame, images of exposure condition indicating means of the camera such as, for example, an exposure meter indicator and/or a re-set indicator therefor, as well as scales of exposure values, diaphragm values, and so forth. With these arrangements, both the image of the picture limiting frame and the image of the indicating elements can be observed with good definition without substantially altering the position of the eye and without substantially shifting the camera from the position in which it is placed to take a photograph.

The viewfinders most commonly used in this connection are the so-called "Newton" viewfinders, which provide a reduced image of the objective in the field of view, and in which the light rays forming the image of the picture limiting frame are directed into the viewfinder body proper from the side. For this purpose, a partially light permeable mirror is provided in the viewfinder body proper, and is associated with a fully reflective mirror extending substantially parallel to the partially light permeable mirror but mounted outside the viewfinder body proper. The picture limiting frame is positioned in substantially the plane of the object side of the viewfinder, and in the general vicinity of the light ray entry window or front lens thereof. Arrangements of this type make it possible to provide an image of the picture limiting frame at infinity, either by means of the ocular or eye-piece of the "Newton" viewfinder alone or by means of the latter in association with an auxiliary lens positioned in the path of light rays entering the viewfinder from the side. In the particular example of such a finder with a magnification ratio of 1:1, only a single auxiliary lens is needed in the lateral ray path.

However, the aforementioned arrangement has the disadvantage that either an image of the picture limiting frame or an image of a single indicating means, but not both images, can be provided in the viewfinder proper or in the normal field of view therethrough. If the image of the picture limiting frame is provided in the viewfinder, there cannot be provided simultaneously therein an image of a scale, indicator, or the like which lies in a plane different from that of the picture limiting frame. In other words, where the frame and the indicating means are at different distances from the collimating lens, the two images cannot be provided in the viewfinder.

The present invention is directed to a viewfinder in which not only can images of both an indicating means and a picture limiting frame, in a plane different from that of the indicating means, be provided in the viewfinder proper, but also in which the construction of the viewfinder is greatly simplified and it is very simple to provide therein the structural parts for providing an image of both the picture limiting frame and an indicating means.

The viewfinder of the present invention is of the type in which the picture limiting frame is disposed laterally of the viewfinder proper. To provide an image of the picture limiting frame at substantially infinity, an obliquely oriented plane partially light permeable mirror, or partially mirrored surface, is provided in the viewfinder body proper. Further, the indicating means of the camera, whose image is also provided in the viewfinder, is located in a plane which differs from that in which the image limiting frame is located and is also positioned outside of the viewfinder body proper. The partially light permeable mirror, partially mirrored surface, or ray divider in the body of the viewfinder, functions not only to provide an image at infinity of the picture limiting frame but also an image at infinity of the indicating means.

In achieving this effect, the image of the picture limiting frame at substantially infinity is provided by light rays from the picture limiting frame reflected by the partially light permeable mirror after having passed through two spherical surfaced optical elements or members disposed in the path of the light rays in advance of the partially permeable mirror, whereas the image at substantially infinity of the indicating means is formed by light rays directed through only one of these two optical members and reflected by the partially permeable mirror to the eye-piece or ocular of the viewfinder.

More particularly, the two optical elements through which light rays from the picture limiting frame reach the partially light permeable mirror, or partially mirrored suface, comprise a pair of plano-convex lenses having substantially spherical convex surfaces facing in opposite directions relative to the direction of light rays therethrough, the two lenses being so proportioned as to size and refractive power and so designed as to conjointly provide a focal length which assures provision of an image of the picture limiting frame at substantially infinity as viewed through the eye-piece of the finder. One of the lenses preferably is larger than the other, and this is located closer to the eye-piece or light ray exit surface or window of the viewfinder. This lens has the light rays from the indicating means, reflected to the eye-piece of the finder, passing therethrough to provide an image of the indicating means, as viewed through the eye-piece, at substantially infinity. The two lenses are preferably connected together, as by cementing, with the interface portions of the two lenses being leveled off for such joining.

Preferably, but not necessarily, the space between the picture limiting frame and the first plano-convex lens is constituted by a prism formed with an oblique surface which reflects the light rays from the picture limiting frame to the first lens. This oblique surface lies substantially parallel to the plane of the partially light permeable mirror, or partially mirrored surface within the viewfinder body proper. If it is desired that the image of the indicator or scale appear at the edge of the image of the picture limiting frame, then the optical axis of the first lens is arranged at an angle of other than 90 degrees to the optical axis of the viewfinder or, considering the angle between the lens axis and the viewfinder axis toward the front of the viewfinder, this angle is greater than 90 degrees. Furthermore, when the second lens is larger than the first lens, the rays of light from the indicating means strike only the outer periphery of this lens wtihout passing through the smaller lens.

It is preferable to design the viewfinder body in block form and comprising two prisms. One of these prisms has the finder light ray entry window, or objective, at its outer end, and has an oblique surface at its inner end. The other prism has an inner oblique surface which mates with the oblique surface of the first prism and has a side surface, facing in the direction of the picture limiting frame, lying in a plane at a small acute angle to the optical axis of the viewfinder. This other prism thus projects somewhat outside the viewfinder body proper. The purpose of this is to provide the aforementioned angle between the light rays from the picture limiting frame and the optical axis of the viewfinder. A third prism is provided with an outer surface normal to the viewfinder optical axis and carrying the picture limiting frame. This third prism has a side surface which is parallel to the sloping side surface of the second prism of the viewfinder body proper, and the two lens have their plane surfaces secured to the respective parallel and sloping faces of these latter two prisms. The interface between the inner sloping end surfaces of the two body prisms carries a partially light permeable mirror or is partially mirrored.

In accordance with the invention, it is possible to construct the entire assembly of no more than two parts, which are connected with each other on the oblique interface carrying the ray divider or partially permeable mirror, or which is partially mirrored. One of these parts constitutes the first prism mentioned above and which carries the objective of the viewfinder. The other part, which carries the eye-piece of the viewfinder, is made integral with the prism which carries the picture limiting frame, and the integral element is further formed with a connecting intermediate portion, between the two prismatic parts, shaped to form the two plano-convex lenses. One of these lenses, both of which are formed integral with the larger part of the body, extends laterally beyond the other so that only this one lens is in the path of light rays from the indicating means whose image is to be reflected into the viewfinder eye-piece. This larger part of the viewfinder advantageously could be formed as an injection molded piece, as could also the smaller part of the viewfinder which carries the viewfinder objective, the material used being a molded plastic.

However, since molded plastic parts are not suitable in all cases, such as in a combined viewfinder and distance meter, or a so-called range finder, which requires a particularly high degree of optical precision, it is advisable in such instances to make the larger element of the device of optical glass. The production of complicated structural parts of optical glass involves technical problems. To overcome these problems, in accordance with the invention, precision optical treatment is used for only certain parts. That is, grinding and polishing are used for only such certain parts, whereas other parts are only roughly finished, as by being only milled. The interface forming the locus of the partially light permeable mirror, or partially mirrored surface in the viewfinder body proper is finished with optical precision, as is also the reflecting surface of the larger part of the finder. Optical precision is also used in finishing the light ray exit or eye-piece surface or window and the light ray entry or objective surface or window of the viewfinder. However, the facing convex lens faces at the cross-over in the larger part of the viewfinder, as well as the supporting surface therein for the picture limiting frame, are given only a rough finish as by milling or grinding. These particular surfaces, which are finished only roughly, are then coated with a strongly adhesive thermoplastic synthetic cement which is set to optical precision by means of appropriate molding apparatus and in such a manner as to form a smooth and hard surface layer.

For an understanding of the principles of the invention, reference is made to the following description of typical embodiments thereof as illustrated in the accompanying drawing. In the drawing.

Figure 1:
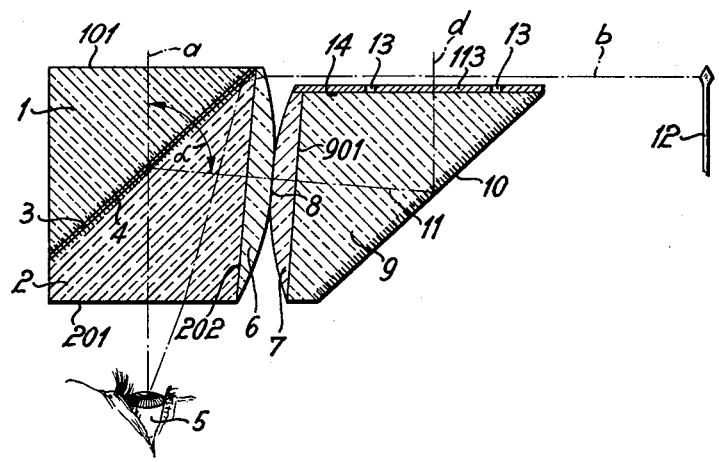
FIG. 1 is a somewhat schematic sectional view through a photographic viewfinder embodying the invention and having a magnification ratio of 1:1.

Referring more particularly to FIG. 1, the photographic viewfinder illustrated therein provides, in the field of view of an observer looking through the eye-piece, not only an image of a picture limiting frame but also an image of an exposure condition indicating means such as an exposure meter indicator located in a plane different from that of the picture limiting frame. The viewfinder body proper comprises transparent prismatic parts 1 and 2, of glass or plastic, united to each other along mating oblique inner end surfaces by a layer of transparent cement 3. At the interface between parts 1 and 2, there is located a partially light permeable mirror, or partially mirrored surface, 4 which reflects the rays $d$ from the picture limiting frame, along the optical axis $a$ in the direction of the observer's eye 5. The objective end, or light ray entry surface or window, of the viewfinder body is indicated at 101, whereas the eye-piece end, or light ray exit surface or window, thereof is indicated at 201.

A plano-spherically convex lens 6 has its planar face cemented to a lateral face 202 of prism part 2 sloping at a small angle to axis $a$, and a plano-spherically convex lens 7 has its convex surface cemented to the convex surface of lens 6. At their interface, both lenses 6 and 7 are flattened, as at 8, to facilitate their cementing together. The planar surface of lens 7 is cemented to the sloping lateral surface 901 of a prism 9, this sloping surface, as well as the sloping surface 202, being perpendicular to the axis 11 of the light rays from the picture limiting frame. The oblique surface 10 of prism 9 acts as a mirror, and this surface is in a plane substantially parallel to the partially transparent mirror, or partially mirrored surface, 4. With the proper glass used for part 9, mirror coating of surface 10 can be eliminated if the total reflection therefrom is adequate.

The portion 11 of the path $d$ of rays from the picture limiting frame forms an angle $\alpha$ which is greater than 90 degrees, with the optical axis $a$ of the viewfinder body. While this portion of the path of the light rays may extend perpendicular to the optical axis of the viewfinder, in such case the image of an indicator 12 will generally lie within the field delimited by the picture limiting frame, and not on or just outside the edge of this field.

The picture limiting frame 13 is mounted directly on the prism 9, as by being cemented onto a matted face 14 on the object facing or light ray entry end surface of the prism 9. However, and as shown in FIG. 1, it may also be provided on a separate plate 113 which is, in turn, either firmly cemented with prism 9 or mounted on prism 9 in such a manner as to be displaceable relative thereto for the purpose of parallax compensation. In such latter case, the displacement may be coupled, in a known manner, with the adjustment of the objective of the viewfinder. Lenses 6 and 7 are so selected with respect to their size and refractive power that, combined, they have a focal length such as to provide, in conjunction with the partially light permeable mirrored interface 4, an image of the picture limiting frame 13 at substantially infinity in the field of view of the viewfinder.

In the arrangement shown in FIG. 1, one of the lenses 6 or 7 is larger than the other so as to project laterally beyond such other lens whereby the light rays from the indicator 12, indicated at $b$, pass only through the laterally projecting part of the larger lens. Preferably, the laterally larger lens is the lens 6, so that the light rays b pass through the portion of lens 6 which projects laterally beyond the periphery of lens 7.

Figure 2:
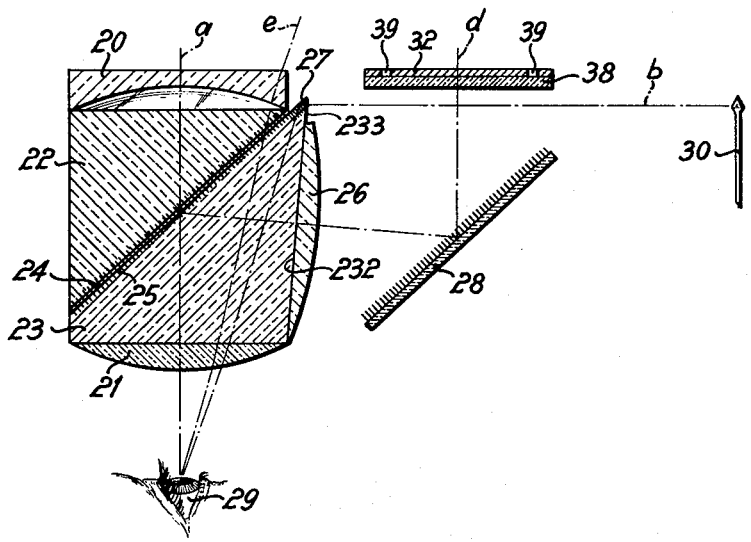
FIG. 2 is a similar view of a photographic viewfinder embodying the invention, but in which a reduced image is provided as is customary in "Newton" type viewfinders.

Referring now to FIG. 2 which illustrates a "Newton" type of viewfinder in which a reduced image is provided, the negative objective lens 20 corresponds to the front member of a "Newton" viewfinder, and is combined optically with a condensing lens 21 acting as the eye-piece thereof. A body of transparent material, such as glass, joins the lenses 20 and 21 to each other. This block comprises a pair of prisms 22 and 23 cemented together along mating oblique inner end surfaces. The partially permeable mirror 25 extends along the oblique surface 24 of the larger prism 23, or surface 24 is partially mirrored. An auxiliary plano-convex lens 26 has its planar face cemented directly to the somewhat oblique or sloping lateral surface 232 of the prismatic part 23, or may be formed integral with the latter. It will be noted that lens 26 is laterally foreshortened so as not to cover the part 233 of the sloping surface 232.

A mirror 28, positioned laterally in substantially parallel spaced relation to the mirrored surface 24, deflects the light rays d to the mirrored surface 25 which, in turn, reflects the rays along optical axis a into the observer's eye 29. The field of view of the viewfinder is limited by the peripheral ray e.

The image of an indicator 30 is provided by a ray b entering through the portion 233 of the face 232 of prism 23 and is reflected by the portion 27 thereof. This portion 27 may be fully mirror coated or may function by means of total reflection. Alternatively, reflection of the ray b could be effected by the partially light permeable mirror 25.

With the arrangement of FIG. 2, a break-up, in the pupil of the eye, of the rays from the picture limiting frame and the rays from the indicator 30 is practically impossible, so that the image of the indicator 30 is visible even if the observer does not look through the viewfinder exactly in the optically correct direction along the axis a thereof.

The picture limiting frame 39 is supported on a plate 32 resting on a plate 38 of glass or other transparent material. The conjoint assembly of elements 32, 38, and 39 can be adjusted as a unit, or the plate 32 with the frame 39 can be adjusted relative to the plate 38, for the purposes of parallax compensation by means of any conventional adjusting means. Such adjusting means has been omitted from the drawing in order to simplify and clarify the illustration in the drawing. For example, such adjustment could be coupled in a well-known manner with the means for adjusting the setting of the objective of the viewfinder.

In forming the image of the picture limiting frame 39, the eye-piece lens 21 acts conjointly with the auxiliary lens 26 to form a system having a focal length which is shorter than that of the eye-piece 21 which, in turn, operates conjointly with the objective lens 20 to form the "Newton" type finder. The eye-piece 21 also serves as a collimator lens for providing the image of the indicator 30.

In the arrangement shown in FIG. 2, it is also possible to use a prism in place of the mirror 28, this prism being preferably cemented to the vertex of lens 26 which would be provided with a flattened surface for that purpose. In this case, the mirror 28 would form a unitary structure with the body of the viewfinder even in the case of a "Newton" viewfinder. Such a prism could also be designed in a manner similar to the prism 9 of FIG. 1, so that it could further be united with the support 38 of the picture limiting frame 39.

Figure 3:
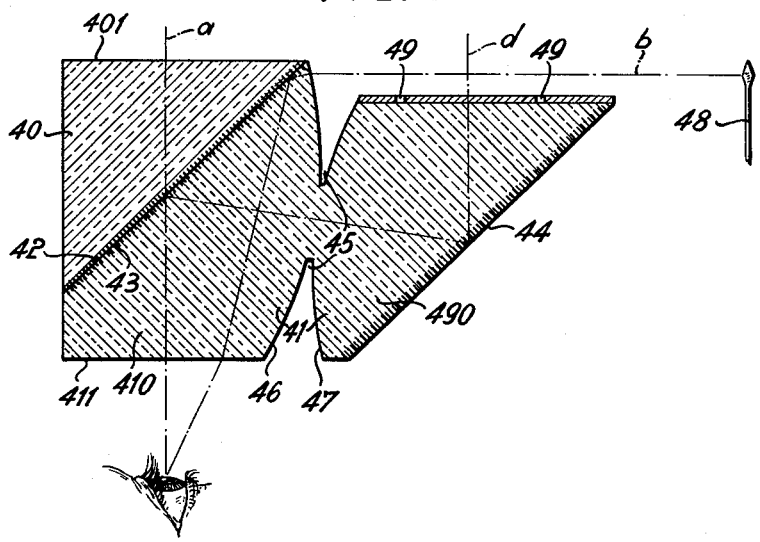
FIG. 3 is a view similar to FIG. 1, but illustrating a form which the viewfinder may take and which is particularly advantageous from the production standpoint.

FIG. 3 illustrates a viewfinder which has particular advantages from the standpoint of simplified production. In this viewfinder, the parts 2, 6, 7, and 9 of FIG. 1 are combined into a single body made up of a unitary piece of transparent material, such as glass, so that the entire arrangement comprises only two parts, 40 and 41. The prism 40 has an oblique inner end surface which is cemented, by using transparent cement, to a mating oblique inner end surface of body 41. One of these two oblique surfaces, for example the oblique surface 42 of body 40, carries the partially light permeable mirror 43, or is partially mirrored. The objective end 401 of the viewfinder is on the part 40, while the eye-piece end 411 of the viewfinder is on the body 41.

The part 41 includes a prism shaped portion 410 forming part of the body proper of the viewfinder. This portion 410 is integral with a prism shaped body 490 carrying the picture limiting frame 49. The intermediate portion between the two prism shaped bodies 410 and 490 is formed as a pair of facing plano-convex lenses. Surface 44 of the body 41, which is substantially parallel to surface 42 thereof, either may be fully reflective, as by a mirror coating, or function, by virtue of its total reflection, as a reflecting mirror. The part 41 is provided with an intermediate portion or a cross-over 45 having facing spherical faces 46 and 47 which have the same effect as the corresponding spherically convex faces of lenses 6 and 7 of FIG. 1.

The relative lateral dimensions of the faces 46 and 47 are so selected that a ray b from indicator 48 passes through one of the lenses 46 and 47 only such as the lens 46, and thus provides, at substantially infinity in the field of view of an observer, an image of an indicator 48 lying substantially in the focal plane of the lens face 46. On the other hand, the picture limiting frame 49 has its image formed by rays passing through the two lens faces 46 and 47. The optical ratios and effects are identical with those of the type of design shown in FIGS. 1 and 2.

Body 41 can advantageously be made by injection molding of moldable transparent plastic. In special cases, and particularly where the viewfinder is also to be used as a range finder, it is practical to use an unstressed transparent material, such as optical glass, for the body 41 and the prism 40. In such cases, however, the finishing of the faces 45 and 46 in accordance with accepted optical procedure presents difficulties, particularly where body 41 is a unitary and integral part. These difficulties are obviated by the designs of viewfinders described hereinafter.

Figure 4:
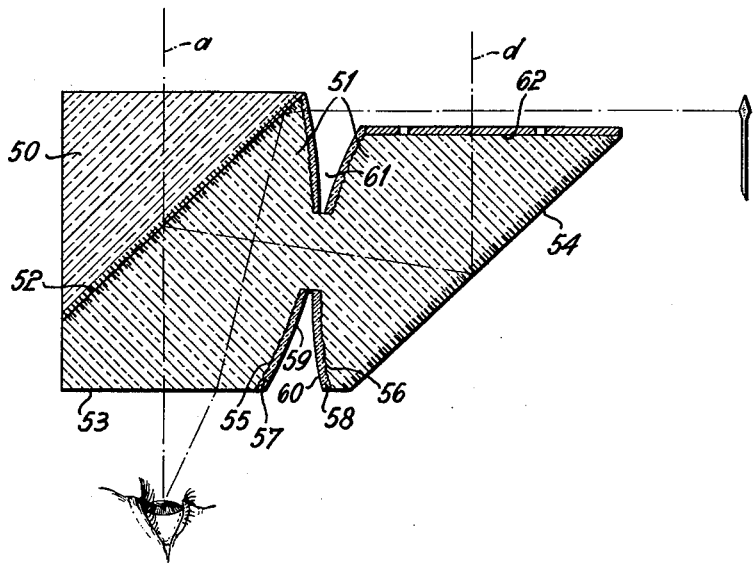
FIG. 4 illustrates the type of viewfinder shown in FIG. 3 but having roughly finished surfaces coated with a transparent cement.

Referring to FIG. 4, a body 51 having an oblique inner end surface 52 cemented to the mating oblique inner end surface of a prism 50 of the viewfinder, and where the ray divider or partially mirrored surface is arranged in the cemented interface of these two oblique surfaces, is produced as an orthorhombic glass unit having plane parallel surfaces 52 and 54 which are adaptable for optical finishing in a conventional manner. A light ray exit end surface 53 on the eye-piece end of the viewfinder can also be optically precision finished in a familiar manner, as by being ground and polished. A face 62, supporting the picture limiting frame, need only be milled. The cross-over 61, identical to the cross-over 45 of FIG. 3 and having facing spherical surfaces 55 and 56, is relatively easy to produce by milling, but the polishing of these surfaces 55 and 56 poses very great technical difficulties.

To obtain an adequate optical quality with respect to surfaces 55 and 56 and their ability to provide proper images of the picture limiting frame and of the indicator, in accordance with the invention, layers of transparent cement 57 and 58 are firmly adhered to glass surfaces 55 and 56 and possess the same index of refraction as does the glass. Furthermore, the material of these layers 57 and 58 is such as to have an adequate surface hardness.

The outer surfaces 59 and 60 of the cement layers have their shapes imparted thereto by a segmented mold having a shape exactly corresponding with the desired shape of these outer faces. This mold is maintained in position in the cross-over of the body for a length of time sufficient for the cement layers to become hardened. The mold has not been illustrated in the drawing, as its shape and the manner of producing the same will be readily apparent from a knowledge of the purpose for which it is intended.

Hardening of the outer surfaces can be hastened by polymerization, or by means of cooling if a thermoplastic material is shaped as a coating mass. Epoxide and epoxyline resins, polyamides, methacrylates, polystyrenes, polycarbonates and polyethylenes are particularly suitable for use as cements where polymerization is used for hardening.

A further expedient to provide proper shaping of the surfaces 55 and 56 and proper characteristics of the surfaces 59 and 60 consists in the cementing, to these surfaces, of prepared glass or plastic shells, utilizing a transparent cement similar to one of those mentioned above. This is particularly useful where only the outwardly facing surfaces need to be prepared with optical precision, as by polishing, and where the material used for making these shells has the same index of refraction as the cement and the base unit.

Figure 5:
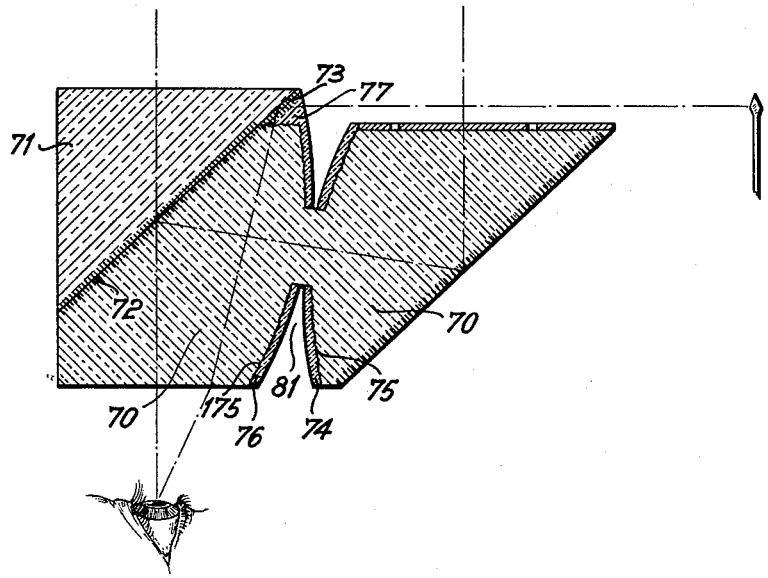
FIG. 5 illustrates a modified form of the viewfinder shown in FIG. 4.

FIG. 5 illustrates a viewfinder which is essentially similar to that of FIG. 4 differing therefrom in only certain minor particulars. The prism 71, carrying a partially light permeable mirror 72 or partially mirrored surface, and having the fully reflecting mirrored surface 73, is cemented to the relatively large body 70 at the mirrored interface. The cement layers 74 and 76 in the area of the cross-over 81 have the same functions as the layers 57 and 58 of the viewfinder of FIG. 4. Their effect is to smooth the faces 75 and 175, which have been finished only roughly, as by milling.

The cement layer 76 also includes a cement body portion 77. The outer face of body portion 77 is a spherical surface homogeneous with the outer surface of the cement layer 76. Body 77 may be designed either as a separate glass part which is cemented in place, or may be formed of the cement itself. In place of glass, there could be used an unstressed plastic, such as acrylic acid, acrylic ester, or a material having the same properties. Similarly, a liquid solution of the substance in a vaporizable solvent, such as acetone, can be employed in place of this type of plastic cement. In addition, a similar substance, or a substance of a similar type, can be applied by means of a polymerization process without any injurious stresses being developed in such process.

While specific embodiments of the invention have been shown and described in detail to illustrate the application of the principles of the invention, it will be understood that the invention may be embodied otherwise without departing from such principles.

What is claimed is:

1. A viewfinder, for photographic cameras, arranged to provide, in the field of view of an observer looking generally along the optical axis of the viewfinder toward the object to be photographed, an image of a picture limiting frame disposed laterally of the optical axis of the viewfinder and an image of exposure condition indicating means of the camera displaced from the plane of said frame at a greater distance from the optical axis than said frame and on the same side of the optical axis as said frame; said viewfinder comprising, in combination, means forming a partially mirrored surface disposed across the optical axis of the viewfinder at an acute angle to said optical axis, between the light ray entrance and exit windows of the viewfinder and facing the exit window; light ray directing means operable to direct the light rays from the frame to said partially mirrored surface for reflection thereby along said optical axis to said exit window and the eye of an observer; and means providing a pair of coaxial convex lens surfaces disposed in the path of said light rays between said light ray directing means and said optical axis, said convex lens surfaces being adjacent and facing each other to define an air space of biconcave shape; one of said convex lens surfaces having greater lateral dimensions than the other of said convex lens surfaces so that said one convex lens surface has a laterally projecting portion which projects laterally beyond said other convex lens surface; said lens surfaces having positive refractive powers and being so positioned and oriented with respect to said partially mirrored surface that the sum of the refractive powers of said two convex lens surfaces, in conjunction with said partially mirrored surface, provide an image of said frame at substantially infinity in the field of view of said viewfinder; the laterally projecting portion of said one convex lens surface also projecting beyond said light ray directing means and said partially mirrored surface and laterally projecting portion of said one convex lens surface being disposed in the path of the imaging light rays for said exposure condition indicating means, the laterally projecting portion of said one convex lens surface and said partially mirrored surface being relatively oriented, with respect to each other and to said exposure condition indicating means, such that the refractive power of said one convex surface lens, in conjunction with said partially mirrored surface, provides an image of said exposure condition indicating means at substantially infinity in the field of view of said viewfinder; the imaging light rays for said exposure indicating means bypassing said other convex lens surface and said light ray directing means.

2. A viewfinder for photographic cameras as claimed in claim 1 in which said lens surfaces are integrated with each other and respectively with said light ray directing means and a viewfinder body which carries said partially mirrored surface.

3. A viewfinder for photographic cameras, as claimed in claim 1, in which the path of light rays directed by said light ray directing means to said partially mirrored surface intersects said optical axis at an angle of other than 90 degrees providing an image of said indicating means, in said field of view, displaced outside the limits of the image of said frame.

4. A viewfinder for photographic cameras, as claimed in claim 1, in which said partially mirrored surface is formed at the interface between a pair of mating oblique surfaces on a pair of prisms conjointly forming the body proper of the viewfinder; said mating oblique surfaces being cemented together to form an integrated body proper for the viewfinder, one of said prisms having a surface extending substantially perpendicular to said optical axis and constituting the entry window of the viewfinder, and the other of said prisms having a surface extending substantially perpendicular to the optical axis and constituting the exit window of the viewfinder, said one of said lens surfaces being integrated with a substantially planar lateral face of said other prism, with its convex surface extending outwardly therefrom; a third prism positioned laterally of the body proper of said viewfinder and having a substantially planar face perpendicular to the axis of the viewfinder and carrying said frame and a lateral substantially planar face substantially parallel to said lateral planar face of said other prism and having the other of said lens surfaces integrated therewith; said lens surfaces having their convex surfaces flattened at the vertices thereof with the flattened portions in juxtaposition; said third prism having a surface constituting said light ray directing means.

5. A viewfinder for photographic cameras, as claimed in claim 4, wherein said other prism, said third prism, and said pair of lens surfaces are formed from a single block of transparent material.

6. A viewfinder for photographic cameras, as claimed in claim 5, in which said single block is an injection molded piece of transparent plastic composition material.

7. A viewfinder for photographic cameras, as claimed in claim 5, in which the oblique surface and the exit window surface of said other prism, and the oblique surface of said third prism, are ground and polished with optical precision; the frame carrying surface of said third prism and said convex lens surfaces being finished only roughly; and a coating of polymerized plastic cement, having the same index of refraction as said single block, applied to said convex lens surfaces.

8. A viewfinder for photographic cameras, as claimed in claim 7, including glass elements forming said convex lens surfaces and having rough finished concave surfaces, adhered to the cement on said convex lens surfaces, and outer convex surfaces which are ground and polished with optical precision; the glass elements having the same index of refraction as the material of said single block and said cement.

9. A viewfinder for photographic cameras, as claimed in claim 7, in which the oblique surface of said one prism extends outwardly beyond a truncated edge of said other prism; the projecting part of said oblique surface of said one prism being fully mirrored; and a filling of said polymerized plastic cement within the space bounded by the truncated portion of said other prism and the projecting part of said one prism and completing the edge of said one of said lens surfaces.

10. A viewfinder for photographic cameras, as claimed in claim 7, in which the oblique surface of said one prism extends beyond a truncated edge of the other prism and is fully mirror coated in its projecting portion; and a block of glass filling the space between said truncated portion and said projecting portion and completing said one convex lens surface; said glass block having surfaces, which are rough finished only, cemented to said one prism and to said other prism, and having its exposed convex surface ground and polished with optical precision.

References Cited in the file of this patent

UNITED STATES PATENTS

| | | |
|---|---|---|
| 2,537,996 | Hankes | Jan. 16, 1951 |
| 2,919,623 | Tronnier | Jan. 5, 1960 |
| 2,959,092 | Faulhaber | Nov. 8, 1960 |
| 3,007,365 | Sho | Nov. 7, 1961 |
| 3,029,720 | Leitz et al. | Apr. 17, 1962 |
| 3,033,090 | Winkler | May 8, 1962 |
| 3,076,397 | Briskin et al. | Feb. 5, 1963 |

FOREIGN PATENTS

| | | |
|---|---|---|
| 206,282 | Austria | Nov. 25, 1959 |
| 1,169,215 | France | Sept. 8, 1958 |
| 523,662 | Great Britain | July 19, 1940 |
| 547,045 | Great Britain | Aug. 11, 1942 |